(12) United States Patent
Bussinger (10) Patent No.: US 7,841,436 B2
(45) Date of Patent: Nov. 30, 2010

(54) PERSONAL MOBILITY VEHICLE

(75) Inventor: Allen Bussinger, Saginaw, MI (US)

(73) Assignee: Amigo Mobility International, Bridgeport, MI (US)

(*) Notice: Subject to any disclaimer, the term of this patent is extended or adjusted under 35 U.S.C. 154(b) by 85 days.

(21) Appl. No.: 12/357,216

(22) Filed: Jan. 21, 2009

(65) Prior Publication Data
US 2009/0272594 A1 Nov. 5, 2009

Related U.S. Application Data

(60) Provisional application No. 61/022,436, filed on Jan. 21, 2008.

(51) Int. Cl.
*B62D 61/08* (2006.01)

(52) U.S. Cl. .............. 180/214; 180/210; 180/65.1; 180/65.51; 180/65.6

(58) Field of Classification Search ............ 180/210, 180/211, 213, 214, 65.1, 65.51, 65.6, 65.7, 180/12, 13
See application file for complete search history.

(56) References Cited

U.S. PATENT DOCUMENTS 4,403,673 A * 9/1983 Ball ....................... 180/214
4,729,447 A * 3/1988 Morse ..................... 180/65.1
4,750,578 A * 6/1988 Brandenfels .............. 180/13
5,497,844 A * 3/1996 Fritzinger ................ 180/65.6
5,714,815 A * 2/1998 Fritzinger et al. .......... 310/89
6,834,734 B2 * 12/2004 Wu ........................ 180/65.51
7,023,177 B1 * 4/2006 Bussinger ................. 320/109

* cited by examiner

*Primary Examiner*—Ruth Ilan
(74) *Attorney, Agent, or Firm*—Robert L. Farris; Farris Law, P.C.

(57) ABSTRACT

The driven front wheel drive assembly includes a drive assembly with a drive frame. The drive frame has a vertical plate that pivots about a steering axis. A gear case with a plate portion and a skirt is clamped to the vertical plate to form a sealed gear case. A helical pinion gear is on a driven motor shaft. A compound gear with a helical gear is in mesh with the helical pinion gear. A first drive pinion gear fixed to the helical pinion gear is in mesh with the first spur gear. A second spur gear is fixed to the drive axle shaft and in mesh with first drive pinion gear. All of the gears are in the gear case rotate about parallel axes. The helical pinion gear and the first drive pinion gear have small pitch diameters to increase torque. The driven axle drives a wheel.

14 Claims, 6 Drawing Sheets

PERSONAL MOBILITY VEHICLE

CROSS REFERENCE TO RELATED APPLICATION

This application claims the benefit of the filing date of U.S. Provisional Application No. 61/022,436, titled STEERING DEVICE THAT TRANSFERS, EXTENDS, & MULTIPLIES TORQUE filed Jan. 21, 2008.

TECHNICAL FIELD

The invention relates to a steered and driven wheel for three wheeled vehicles used for personal mobility.

BACKGROUND OF THE INVENTION

Three wheeled carts are employed as shopping carts and personal mobility vehicles. Three wheeled carts including ones that are propelled by manual force are somewhat unstable. They require the ability to accommodate small and large individuals. When used as shopping carts they need to be able to transport heavy cargo.

A vehicle for such use should have a low center of gravity for stability, low weight for stopping and starting limited speed, sufficient power for moving heavy loads, high reliability and low maintenance requirements. Control should be easy and positive. The personal mobility vehicles that are currently available can be improved in all of these areas. Balance in all of the factors is also needed. Personal mobility vehicles that are too slow are useless. Excess speed is difficult to control and generally requires more power and weight than necessary.

SUMMARY OF THE INVENTION

The personal mobility vehicle includes a frame with an integral foot support plate. The integral foot support plate includes a horizontal rear plate portion and an upwardly and forwardly inclined front plate portion.

A power supply housing is mounted on the horizontal rear plate portion of the foot support plate and extends upwardly from the integral foot support plate. The power supply housing houses one or more batteries. A battery charger may also be secured in the power supply housing. A seat with a seat back is mounted on the top of the power supply housing.

A pair of laterally spaced apart non-driven support wheels is journaled on the rear portion of the frame. Both support wheels are rotatable about a transverse horizontal axis. The transverse axis is below a top surface of the horizontal rear plate portion.

A front driven and steerable wheel assembly supports the front frame portion. The front driven and steerable wheel assembly includes a drive frame. A steering tube is mounted on the drive frame and extends upwardly and rearwardly to a free top end. A gear housing is mounted on the drive frame. A reversible electric motor is attached to the gear housing. The reversible electric motor has a motor shaft with a motor shaft axis and is attached to the gear housing. The speed of rotation of the motor shaft is variable. A first idler shaft is mounted in the gear housing. The first idler shaft has a first idler shaft axis that is parallel to the motor shaft axis. A second idler shaft is also mounted in the gear housing. The second idler shaft has a second idler shaft axis that is parallel to the motor shaft axis. A driven axle is journaled in the gear housing for rotation about an axle axis. The driven axle extends to one side of the gear housing. A wheel assembly, with a wheel hub and a tire, is mounted on the driven axle outside the gear housing. The wheel assembly is rotatable with the driven axle about a driven axle axis.

A helical pinion gear on the motor shaft is rotatable with the motor shaft. A compound gear journaled on the first idler shaft includes a helical gear in mesh with the drive screw. A first drive pinion gear is fixed to the helical gear and rotates with the helical gear about the first idler shaft axis. A first spur gear is journaled on the second idler shaft and in mesh with the first drive pinion gear. A second spur gear is fixed to the driven axle and in mesh with the first spur gear. The second spur gear has a second spur gear pitch diameter that is at least as large as a first spur gear pitch diameter.

The first spur gear pitch diameter may be the same as the second spur gear diameter.

The motor shaft axis, the first idler shaft axis, the second idler shaft axis and the driven axle axis may be in a common gear case plane.

The driven axle is horizontally spaced from the motor shaft axis. The driven axle axis is also vertically below the motor shaft axis during forward movement of the personal mobility vehicle.

The gear housing includes a vertical plate of the frame. Gears and shafts in the gear housing are covered by the gear case. The gear case is clamped to the vertical plate of the drive frame by bolts. A gasket creates a seal that is clamped between the vertical plate and a gasket engaging surface on a free edge of a skirt of the gear case.

BRIEF DESCRIPTION OF DRAWINGS

The presently preferred embodiment of the invention is disclosed in the following description and in the following drawings, wherein.

DETAILED DESCRIPTION OF THE PREFERRED EMBODIMENTS

Figure 1:
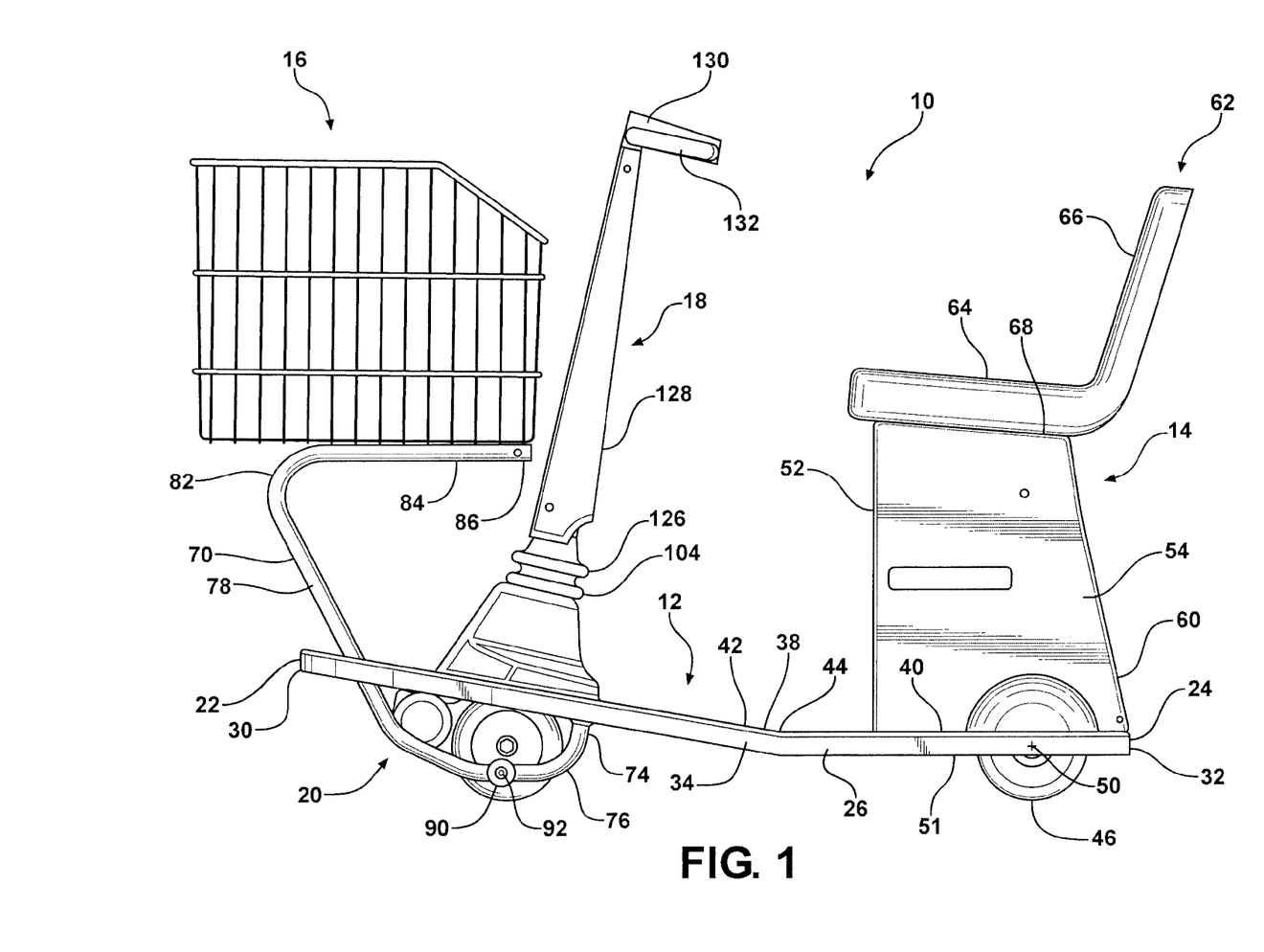
FIG. 1 is a left side elevational view of the personal mobility vehicle with an electric drive.
Figure 2:
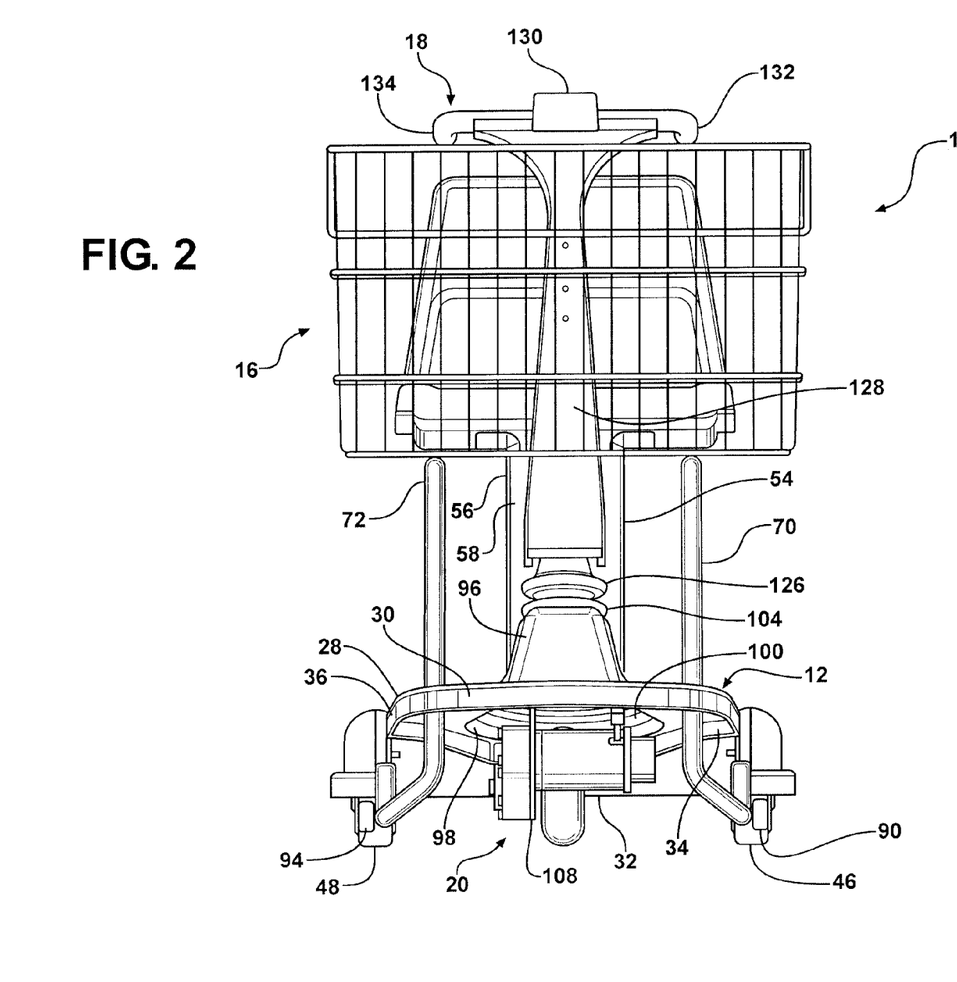
FIG. 2 is a front elevational view of the personal mobility vehicle.
Figure 6:
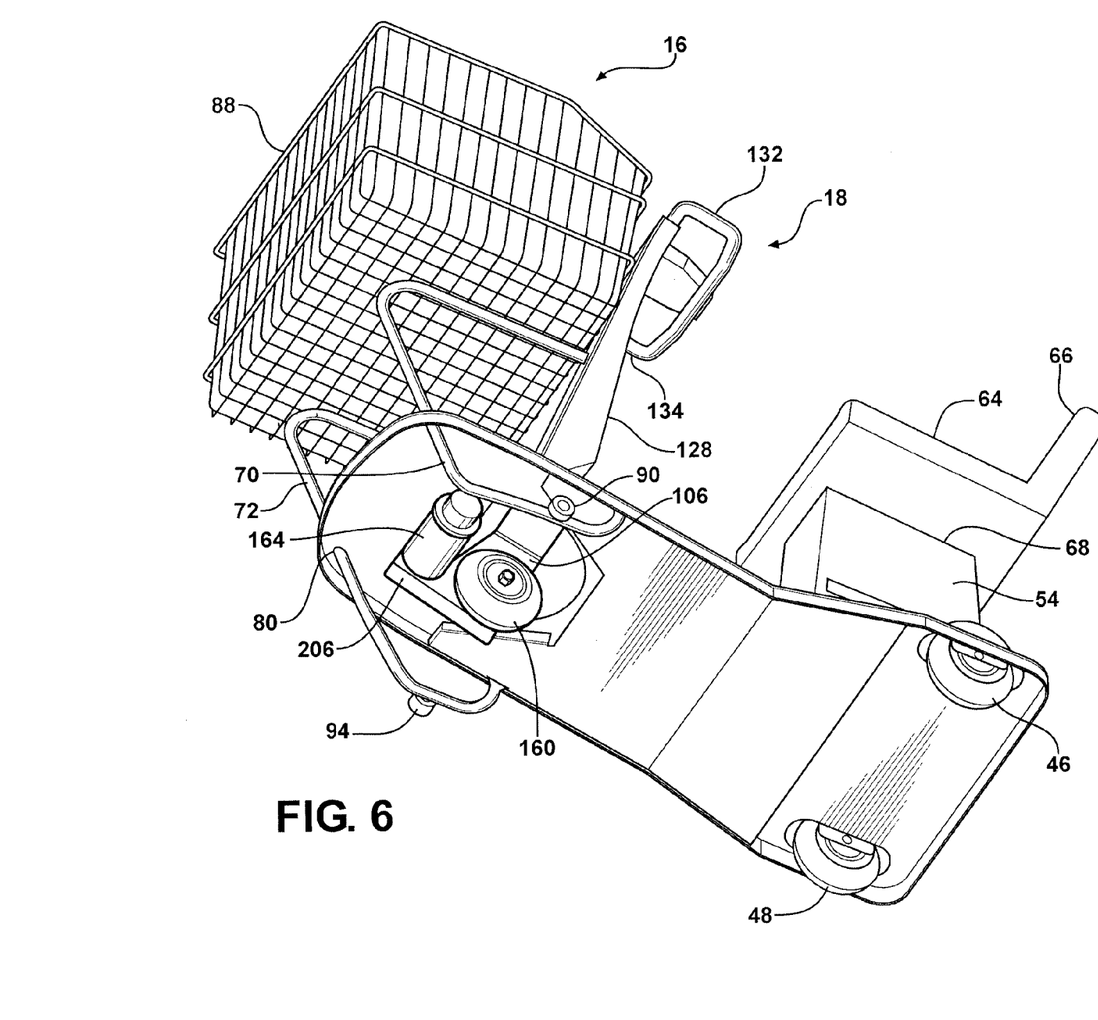
FIG. 6 is a perspective view showing the bottom and left side of the personal mobility vehicle.

The personal mobility vehicle 10 has a frame assembly 12, a seat support and power supply assembly 14, a cargo holding assembly 16, a steering assembly 18, and a drive assembly 20. The frame assembly 12 has a front end 22, a rear end 24, a left side 26 and a right side 28. The front end 22 of the frame assembly 12 includes a transverse front beam 30. The rear end 24 includes a transverse rear beam 32. A left side beam 34 extends from the front beam 30 to the rear beam 32 and is fixed to the front beam and the rear beam. A right side beam 36 extends from the front beam 30 to the rear beam 32 and is fixed to the front beam and the rear beam. The frame assembly 12 also includes a foot rest platform 38 that is fixed to the front beam 30, the rear beam 32, the left side beam 34 and to the right side beam 36. The front beam 30, the rear beam 32, the left side beam 34 and the right side beam 36 that form the frame are preferably integral flanges on the edges of the foot rest platform 38. This construction reduces weight and cost. The construction provides superior strength without excess weight. A rear portion 40 of the foot rest platform 38 is horizontal. A front portion 42 of the foot rest platform 38 is inclined and extends upwardly and forwardly from a transverse location 44. The left side frame 34 and the right side frame 36 are both bent at location 44 to support the front portion 38 of the foot rest platform. An inclined front portion 42 of the foot rest platform 38 provides space for the drive assembly 20, provides improved comfort for an operator of the vehicle 10 and accommodates a lower seat position for ease of mounting by an operator.

The rear portion of the frame assembly 12 is supported by a left tire and wheel 46 and a right tire and wheel 48. Both tires and wheels 46 and 48 are journaled on the rear portion 40 of the frame assembly 12 for rotation about a transverse horizontal wheel axis 50. The wheel support axles may be slightly tilted from horizontal to move the tires and wheels 46 and 48 in the ground contact position slightly closer to each other if desired. The rear portion 40 of the foot rest platform 38 and the frame assembly is lowered for improved stability. The wheel axis 50 is above a bottom surface 51 of the frame 12.

The seat support and power supply assembly 14 includes a container 52. The container 52 includes a left side wall 54 and a right side wall 56 that are attached to the rear portion 40 of the foot rest platform 38 and extend rearward to the rear beam 32 of the frame assembly 12. A front wall 58 is secured to the left side wall 54 and the right side wall 56. The front wall extends upward from the horizontal rear portion 40 of the foot rest platform 38. An optional rear cover 60 if used extends from the left side wall 54 to the right side wall 56 and may be attached to the side walls. The rear cover 60 also extends upward from the horizontal rear portion 40 of the foot rest platform 38. A storage battery or batteries are mounted inside the container 52. A seat assembly 62 with a seat 64 and a back rest 66 is secured to the top end 68 of the container 52. Batteries (not shown) are housed inside the container 52. A battery charger is also mounted inside the container 52. Access to the battery is required for maintenance from time to time. The seat 64 can be moved to open the container top 68 if desired. The optional rear cover 60 can also be removed to provide access to the inside of the container 52 if employed. The rear cover 60 can be attached to the seat assembly 62 and open together with the seat assembly.

An openable door could also be provided in one of the walls forming the container 52. The seat assembly 62 is preferably positioned to place a vehicle operator's center of mass directly above the wheel axis 50 of the rear tire and wheels 46 and 48 or a few inches horizontally forward of the wheel axis. The seat assembly 62 may be adjustable relative to the container 52 in a fore or aft direction. In a rear most position an operator's center of mass is preferably forward of the wheel rotation axis 50 of the non-powered tires and wheels 46 and 48.

The cargo holding assembly 16 includes a left support arm 70 and a right support arm 72. Both support arms 70 and 72 have a rear end 74 secured to the bottom of the front portion 42 of the foot rest platform 38 and to the rear of the transverse front beam 30. An arcuate portion 76 of both support arms 70 and 72 extend downward and forward from their rear ends 74 and then upwardly toward the front beam 30. A straight inclined center portion 78 of each support arm 70 or 72 extends upward and forward from the arcuate portion 76, at an angle of about sixty degrees from horizontal. The straight inclined center portion 78 of each support arm 70 or 72, extends upward through a passage 80 through the foot rest 38 near the front beam 30 and to an upper bend 82. A straight horizontal portion 84, of each support arm 70 or 72, extends rearward from the upper bend 82 to an upper end 86. A cargo basket 88 sits on the straight horizontal portions 84 of both support arms 70 and 72 and is anchored to the support arms.

A left side roller 90 is attached to the lower portion of the arcuate portion 76 of the left support arm 70. The left side roller 90 is journaled on a roller pin 92 for rotation about a transverse horizontal roller axis. The left side roller 90 is normally above a horizontal support surface. The left side roll 90 limits upward movement of the right tire and wheel 48 from the horizontal support surface during an improper operating condition. A right side roller 94 is attached to the lower portion of the arcuate portion 76 of the right support arm 72 by a roller pin 92 that is identical to the roller pin that supports the left side roller 90. The right side roller 94 is journaled on the roller pin 92 for rotation about the transverse horizontal axis that the left side roller 90 rotates about. The right side roller 94 is normally above a vehicle support surface. The right side roller 94 limits upward movement of the left tire and wheel 46 from the vehicle support surface during an improper operating condition.

A mast 96 is welded to the top of the inclined front portion 42 of the foot rest platform 38. A large aperture 98 through the foot rest platform 38 provides access to the inside 100 of the mast 96. A bearing assembly housing 102 is secured to the inside of a top ring 104 of the mast 96.

Figure 3:
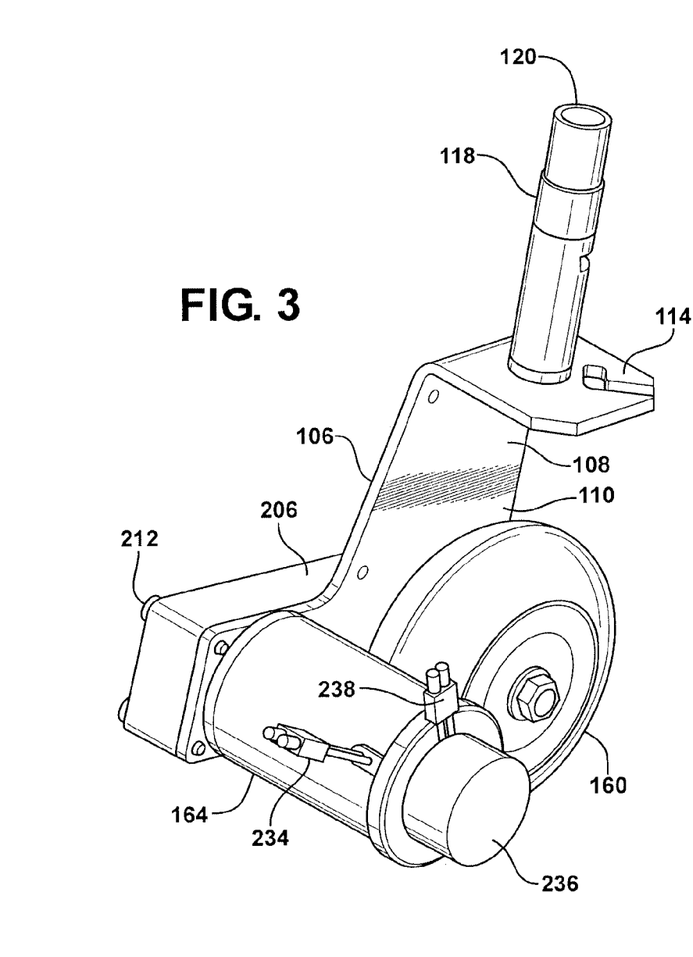
FIG. 3 is a perspective view of the driven and steered front wheel and the drive assembly.
Figure 4:
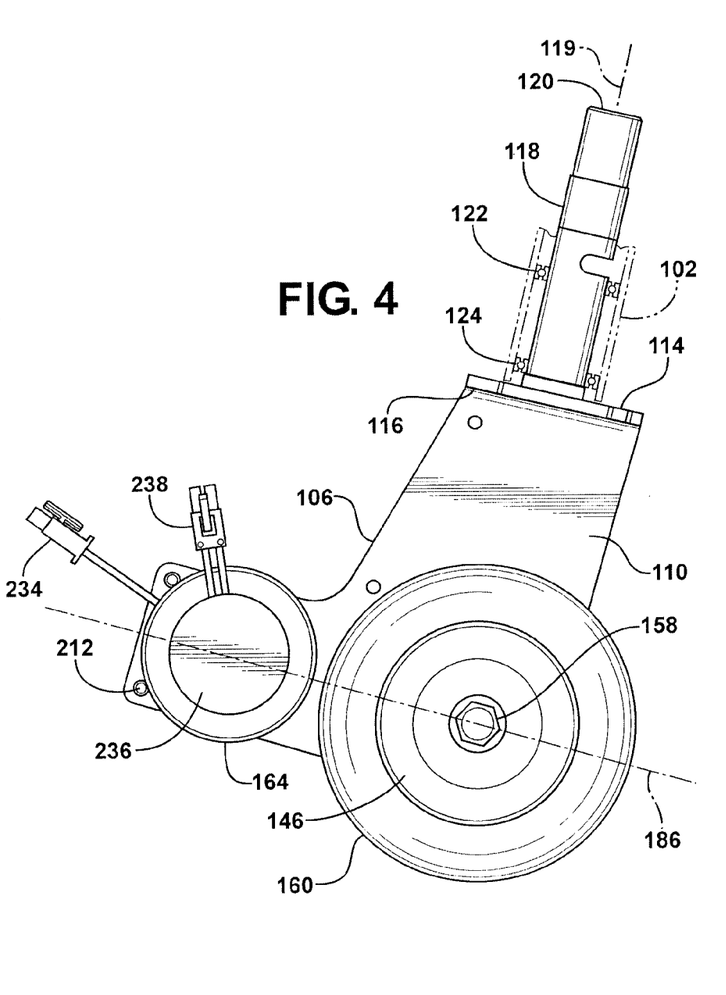
FIG. 4 is an enlarged left side elevational view of the driven and steered front wheel and drive assembly.

The drive assembly 20 includes drive frame 106. The drive frame includes a vertical plate 108 with first side surface 110 and a second side surface 112. An integral flange 114, on the drive frame 106 is perpendicular to the vertical plate 108. The flange 114 extends outward from the first side surface 110 of the vertical plate 108 on a top edge 116 of the vertical plate. A steering tube 118 is welded to the flange 114 and extends upward and rearward to a steering tube free end 120. The axis of the steering tube 118 is a steering axis 119. The steering tube 118 passes through bearings 122 and 124 in the bearing assembly housing 102.

A steering assembly 18 includes a lower drum 126 that receives the upper free end 120 of the steering tube 118. A tiller post 128 is secured to the lower drum 126 and extends upward and rearward from the lower drum. A tiller handle 130 is attached to the top end of the tiller post 128. The tiller handle 130 extends outward to both sides of the tiller post 128. A left hand grip 132 is mounted on the left end of the tiller handle 130. A right hand grip 134 is mounted on the right end of the tiller handle 130.

Figure 5:
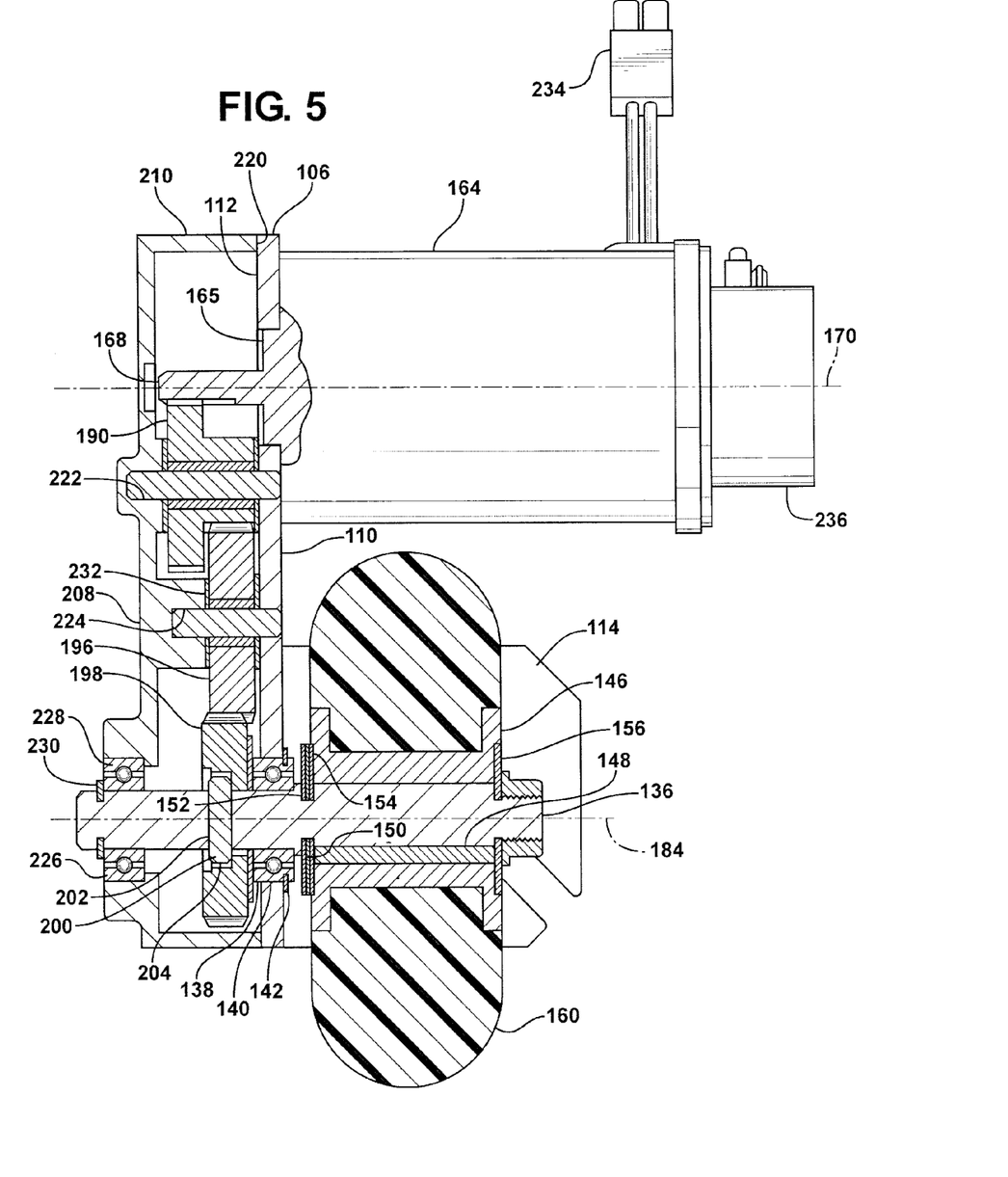
FIG. 5 is an enlarged bottom view of the driven and steered front wheel with parts broken away and shown in section to illustrate the front axle and the gear train from an electric motor to a driven axle.
Figure 7:
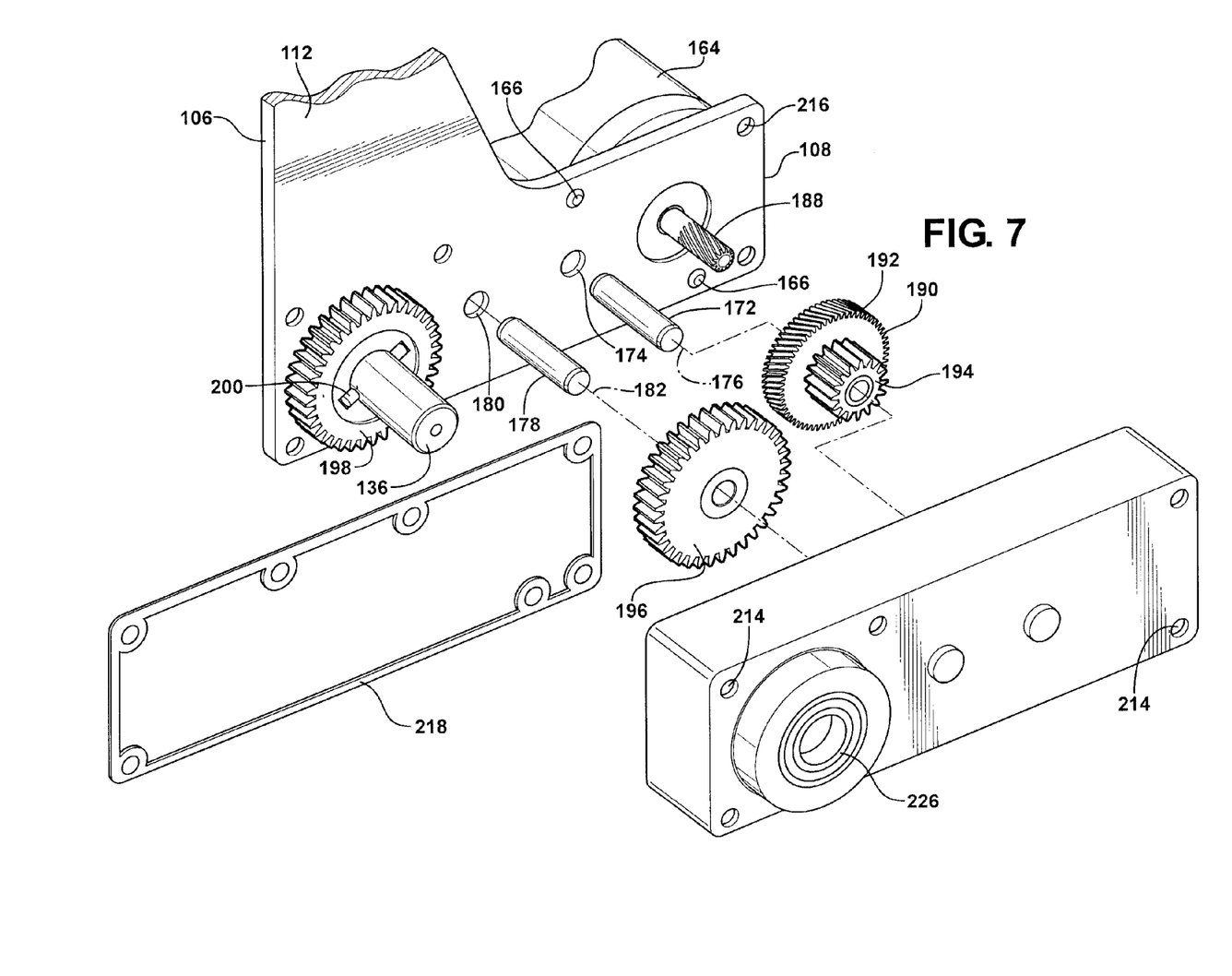
FIG. 7 is an expanded view of the gear train with parts broken away.

The drive assembly 20 includes a driven axle shaft 136 supported by an inboard bearing 138 that is mounted in an inboard bearing bore 140 through the vertical plate 108 of the drive frame 106. A snap ring 142 mounted in a snap ring groove in the outer ring of the inboard bearing 138 limits movement of the bearing into the inboard bearing bore 140. A wheel hub 146 is received on the driven axle shaft 136. A key 148 in key grooves prevents rotation of the wheel hub 146 relative to the driven axle shaft 136. Disks 150 with bores 152 are shims that fill the space between the wheel hub 146 and the inboard bearing 138. A recess 154, in a side of the wheel hub 146 receives one of the disks 150. A washer 156 is clamped against the wheel hub 146 by a retainer nut 158. A tire 160 of resilient material is fixed on the wheel hub 146. The disks 150, the washer 156 and the nut 158 axially fix the wheel hub 146 relative to the driven axle shaft 136.

A reversible electric motor 164 is clamped to the first side surface 110 of the vertical plate 108 by bolts 166. The electric motor 164 has an output shaft 168 that rotates about a motor axis 170. The motor axis 170 is normal to the second side surface 112. A first idler shaft 172 is mounted in a first idler shaft pilot bore 174 in the vertical plate 108. The first idler shaft axis 176 is parallel to the motor axis 170. A second idler shaft 178 is mounted in a second idler shaft pilot bore 180 in the vertical plate 108. The second idler shaft axis 182 is parallel to the motor axis 170. The driven axle shaft 136 has a driven axle axis 184 that is parallel to the motor axis 170. The motor axis 170, the first idler shaft axis 176, the second idler shaft axis 182 and the driven axle axis 184 are all in a common gear case plane 186. The common gear case plane 186 is nearly perpendicular (+3° clockwise about driven axle axis 184) to the steering axis 119. The motor axis 170 is above and forward of the drive axle axis 184 during forward movement.

A helical pinion gear 188 is mounted on the motor output shaft 168. The helical pinion gear 188 is preferably integral with the motor output shaft 168. Helical lands and grooves are rolled into the output shaft 168 or formed by grinding. A compound gear 190 is journaled on the first idler shaft 172. The compound gear 190 includes a helical gear 192 that is in mesh with the helical pinion gear 188. The compound gear 190 includes a first drive pinion gear 194 that is fixed to and driven by the helical gear 192. A first spur gear 196 is journaled on the second idler shaft 178 and in mesh with the first drive pinion gear 194. The first drive pinion gear 194 has a pitch diameter that is smaller than the pitch diameter of the first spur gear 196. A second spur gear 198 is fixed to the driven axle shaft 136 and in mesh with the first spur gear 196. A pin 200 passes through a bore 202 through the driven axle shaft 136 and is received in a recess 204 in the second spur gear 198 to fix the second spur gear 198 relative to the driven axle shaft 136. The first spur gear 196 has a first pitch diameter that is equal to the second pitch diameter of the second spur gear 198.

The helical pinion gear 188 and the helical gear 192 increase torque and decrease speed. The first drive pinion gear 194 and the first spur gear provide an additional increase in torque to the driven axle shaft 136 and a further speed reduction.

A gear case 206 with a plate portion 208 and a skirt 210 are clamped to the second side surface 112 of the vertical plate 108 by bolts 212. The bolts 212 pass through bore 214 through the gear case 206 and screw into threaded bores 216 in the vertical plate 108. A gasket 218 is clamped between the second side surface 112 and a gasket engaging surface 220 on the free edge of the skirt 210 to form a sealed gear case with lubricant. The plate portion 208 of the gear case 206 has a first bore 222 that receives a second end of the first idler shaft 172. The plate portion 208 of the gear case 206 has a second bore 224 that receives a second end of the second idler shaft 178. An outboard bearing 226 is mounted in a bearing bore 228 that passes through the plate portion 208. The driven axle shaft 136 passes through the outboard bearing 226. A lock ring 230 is received in a lock ring groove in the driven axle shaft 136 and anchors the driven axle shaft 136 relative to the gear case 206. Washers 232 are provided to limit axial movement of the gears and to act as thrust bearings.

An electric motor power terminal 234 is connected to the electric motor 164. Both speed and direction of rotation of the motor output shaft 168 are controlled. An electromagnetic brake assembly 236 is mounted on a free end of the electric motor 164 and connected to the motor output shaft 168. A brake control terminal 238 is connected to the brake assembly 236. The terminals 234 and 238 are plugged into the electric control system of the vehicle 10.

I claim:

1. A personal mobility vehicle comprising:
a frame with an integral foot support plate;
a power supply housing mounted a rear portion of the frame;
a seat mounted on the frame;
a pair of laterally spaced apart support wheels journaled on the rear portion of the frame and rotatable about a transverse horizontal axis;
a front driven and steerable wheel assembly supporting a front frame portion and including a drive frame, a steering tube mounted on the drive frame and extending upwardly and rearwardly to a free top end, a gear housing mounted on the drive frame and including a reversible electric motor with a motor shaft having a motor shaft axis attached to the gear housing, a first idler shaft mounted in the housing and having a first idler shaft axis that is parallel to the motor shaft axis, a second idler shaft mounted in the gear housing and having a second idler shaft axis that is parallel to the motor shaft axis, a driven axle journaled in the gear housing for rotation about an axle axis and extending to one side of the gear housing, and a wheel assembly with a wheel hub and a tire mounted on the driven axle outside the gear housing and rotatable with the driven axle about a driven axle axis;
a helical pinion gear mounted on the motor shaft and rotatable with the motor shaft, a compound gear journaled on the first idler shaft and including a helical gear in mesh with the helical pinion gear and a first drive pinion gear that rotates with the helical gear about a first idler shaft axis, a first spur gear journaled on the second idler shaft and in mesh with the first drive pinion gear, a second spur gear fixed to the driven axle and in mesh with the first spur gear and wherein a second spur gear pitch diameter of the second spur gear is at least as large as a first spur gear pitch diameter of the first spur gear.

2. A personal mobility vehicle, as set forth in claim 1 wherein the first spur gear pitch diameter is the same as the second spur gear pitch diameter.

3. A personal mobility vehicle, as set forth in claim 1, including a tiller post attached to the steering tube and a tiller handle attached to a tiller post upper end.

4. A personal mobility vehicle, as set forth in claim 1, wherein the motor shaft axis is spaced horizontally away from the driven axle axis.

5. A personal mobility vehicle, as set forth in claim 4, wherein the motor shaft axis is vertically spaced above the driven axle axis.

6. A personal mobility vehicle, as set forth in claim 1 including an electromagnetic brake, in a brake housing, secured to a motor housing and to the motor shaft.

7. A personal mobility vehicle comprising:
a frame with an integral foot support plate including a horizontal rear plate portion and an upwardly and forwardly inclined front plate portion;
a power supply housing mounted on the horizontal rear plate portion and extending upwardly from the integral foot support plate;
a seat with a seat back mounted on the top of the power supply housing;
a pair of laterally spaced apart support wheels journaled on a rear portion of the frame and rotatable about a transverse horizontal axis;
a front driven and steerable wheel assembly supporting the front frame portion and including a drive frame, a steering tube mounted on the drive frame and extending upwardly and rearwardly to a free top end, a gear housing mounted on the drive frame and including a reversible electric motor with a motor shaft having a motor shaft axis, attached to the gear housing, a first idler shaft mounted in the gear housing and having a first idler shaft axis that is parallel to the motor shaft axis, a second idler shaft mounted in the gear housing and having a second idler shaft axis that is parallel to the motor shaft axis, a driven axle journaled in the gear housing for rotation about a driven axle axis, that is parallel to the motor shaft axis, and extending to one side of the gear housing, and a wheel assembly with a wheel hub and a tire mounted on the drive axle outside the gear housing and rotatable with the driven axle about the driven axle axis;

a helical pinion gear mounted on the motor shaft and rotatable with the motor shaft, a compound gear journaled on the first idler shaft and including a helical gear in mesh with the helical pinion gear and a first drive pinion gear fixed to the helical gear and that rotates with the helical gear about the first idler shaft axis, a first spur gear journaled on the second idler shaft and in mesh with the first drive pinion gear and wherein the first spur gear has a first spur gear pitch diameter that is larger than the first drive pinion gear pitch diameter, a second spur gear fixed to the driven axle and in mesh with the first spur gear and wherein a second spur gear pitch diameter of the second spur gear is at least as large as the first spur gear pitch diameter of the first spur gear.

8. A personal mobility vehicle, as set forth in claim 7 wherein the first spur gear pitch diameter is the same as the second spur gear pitch diameter.

9. A personal mobility vehicle, as set forth in claim 7, wherein the motor shaft axis, the first idler shaft axis, the second idler shaft axis and the driven axle axis are in a common gear case plane.

10. A personal mobility vehicle, as set forth in claim 9, wherein the driven axle axis is horizontally spaced from the motor shaft axis.

11. A personal mobility vehicle, as set forth in claim 10 wherein the driven axle axis is vertically below the motor shaft axis during forward movement of the personal mobility vehicle.

12. A personal mobility vehicle comprising a frame with a front end, a rear end, a right side, a left side; a horizontal rear frame portion, a front frame portion integral with the horizontal rear frame portion and extending forwardly and upwardly from the rear frame portion, and a foot support plate covering at least a part of the rear frame portion and covering the front frame portion;

a power supply housing mounted on the horizontal rear frame portion and extending upward from the rear frame portion, a seat with a seat bottom and a seat back mounted on the power supply housing and a bearing assembly mounted in a mast fixed to the frame front portion and extending upward from the foot support plate;

a pair of laterally spaced apart support wheels journaled on the horizontal rear frame portion for rotation about a transverse horizontal axis and supporting the horizontal rear frame portion above vehicle support surfaces;

a front driven axle and steerable wheel assembly supporting the front frame portion and including a drive frame with a vertical plate and an integral drive frame flange extending from a first side surface and an upper edge of the vertical plate, a steering tube welded to the integral drive frame flange and extending upwardly and rearwardly to a steering tube free upper end, a driven axle shaft passing through an inboard bearing bore through the vertical plate and journaled in an inboard bearing mounted in the inboard bearing bore through the vertical plate, a tire mounted on the driven axle shaft adjacent to a first side surface of the vertical plate, and wherein the steering tube is journaled in the bearing assembly mounted in the mast for pivotal movement about a steering axis that extends upward and rearward, and a tiller bar with a left hand grip and a right hand grip attached to the steering tube free end and extending upward and rearward from the mast; and wherein an electric motor is attached to the first side surface of the vertical plate with a helical pinion gear mounted on an electric motor output shaft and extending through a helical pinion gear bore through the vertical plate, a first idler shaft fixed in a first idler shaft bore in a second side of the vertical plate, a compound gear journaled on the first idler shaft, including a helical gear in mesh with the helical pinion gear, and a first drive pinion gear integral with the helical gear and rotatable about a first idler shaft axis, a first spur gear journaled on the second idler shaft and in mesh with the first drive pinion gear journaled on the first idler shaft, a second spur gear fixed by a retainer pin that passes through an axle pin bore and is received in a retainer pin recess in the second spur gear, to the driven axle shaft and in mesh with the first spur gear and wherein the second spur gear has a second pitch diameter that is the same as a first pitch diameter of the first spur gear, a motor axis of the electric motor output shaft, a first idler shaft axis of the first idler shaft, a second idler shaft axis of the second idler shaft, axis and a driven axle of the front driven axle are all parallel to each other and in a common plane that extends forward and upward from a front wheel and tire;

a gear housing including a housing plate, a housing skirt integral with the housing plate, a flat gasket engaging surface on the gear housing, a housing first idler shaft bore that receives a first idler pin end, a second idler pin bore in the housing plate that receive a second idler pin end, an outboard bearing bore, and wherein a gasket is positioned against a second side surface of the vertical plate and is clamped between the second side surface and the flat gasket engaging surface by bolts that pass through bores in the gear housing and screw into threaded bores in the vertical plate.

13. A personal mobility vehicle as set forth in claim 12 including an electromagnetic brake in a brake housing secured to the electric motor housing and the motor output shaft.

14. A personal mobility vehicle as set forth in claim 13, including a cargo holding assembly with a left support arm with a left lower end secured to the frame and foot rest assembly and a left upper end, a right support arm with a right lower end secured to the frame and foot rest assembly and a right upper end and a cargo basket mounted on a left upper portion of left support arm and a right upper portion of the right support arm.

\* \* \* \* \*